United States Patent
Sibley (10) Patent No.: US 8,074,930 B2
(45) Date of Patent: Dec. 13, 2011

(54) DOOR FOR OPENING AND CLOSING A DOOR APERTURE IN AN AIRCRAFT

(75) Inventor: Malcolm George Sibley, Bristol (GB)

(73) Assignee: Airbus Operations Limited, Bristol (GB)

( * ) Notice: Subject to any disclaimer, the term of this patent is extended or adjusted under 35 U.S.C. 154(b) by 370 days.

(21) Appl. No.: 12/311,327

(22) PCT Filed: Oct. 1, 2007

(86) PCT No.: PCT/GB2007/050594
§ 371 (c)(1),
(2), (4) Date: Mar. 26, 2009

(87) PCT Pub. No.: WO2008/041023
PCT Pub. Date: Apr. 10, 2008

(65) Prior Publication Data
US 2010/0019089 A1    Jan. 28, 2010

(30) Foreign Application Priority Data

Oct. 4, 2006    (GB) .................................. 0619615.8

(51) Int. Cl.
*E05F 17/00*    (2006.01)
*B64C 1/14*    (2006.01)

(52) U.S. Cl. ............... 244/129.5; 244/129.4; 244/102 R (58) Field of Classification Search ............ 49/40, 73.1, 49/104, 109, 110; 244/129.4, 129.5, 118.3, 244/100 R, 102 R, 102 A, 102 SL, 102 SS
See application file for complete search history.

(56) References Cited

U.S. PATENT DOCUMENTS

| | | | | |
|---|---|---|---|---|
| 3,718,171 A | * | 2/1973 | Godwin | 160/210 |
| 6,345,786 B1 | * | 2/2002 | Sakurai | 244/102 R |
| 7,178,759 B2 | * | 2/2007 | Rouyre | 244/129.5 |
| 7,338,012 B2 | * | 3/2008 | Rouyre | 244/102 R |
| 2005/0211849 A1 | | 9/2005 | Rouyre | |
| 2006/0157621 A1 | | 7/2006 | Santos | |

FOREIGN PATENT DOCUMENTS

| | | |
|---|---|---|
| EP | 1 129 938 | 9/2001 |
| GB | 2 042 060 | 9/1980 |
| WO | 84/01140 | 3/1984 |
| WO | 01/56878 | 8/2001 |

OTHER PUBLICATIONS

International Search Report for PCT/GB2007/050594, mailed Dec. 6, 2007.
Written Opinion of the International Searching Authority for PCT/GB2007/050594, mailed Dec. 6, 2007.
Great Britain Search Report for GB Application No. 0619615.8, dated Jan. 26, 2007.

* cited by examiner

*Primary Examiner* — Robert Canfield
*Assistant Examiner* — Brent W Herring
(74) *Attorney, Agent, or Firm* — Nixon & Vanderhye P.C.

(57) ABSTRACT

An aircraft door is disclosed comprising a first (301), second (302) and third (303) door members pivotably joined and arranged to move from a closed position in which said members are located in a substantially linear arrangement in the aircraft skin to an open position in which said members are located in a relative folded arrangement with the second and third door members situated substantially above the lowest edge of the first door member.

16 Claims, 6 Drawing Sheets

DOOR FOR OPENING AND CLOSING A DOOR APERTURE IN AN AIRCRAFT

This application is the U.S. national phase of International Application No. PCT/GB2007/050594, filed 1 Oct. 2007, which designated the US and claims priority to Great Britain Application No. 0619615.8, filed 4 Oct. 2006, the entire contents of each of which are hereby incorporated by reference.

FIELD OF INVENTION

The present invention relates to a door for opening and closing a door aperture in an aircraft.

BACKGROUND OF THE INVENTION

Aircraft structures commonly comprise a number of doors such as passenger doors, cargo hold doors, maintenance door (or hatches) and landing gear doors. Such doors provide access to the internal parts of the aircraft when open and close so as to conform to the surrounding aircraft structure. An important aspect of many such doors is that during their opening procedure and in their open position they do not impinge, catch or otherwise undesirably contact other parts of the aircraft structure. Furthermore, when the aircraft in on the ground, the doors should not impinge on the ground or other ancillary structures such as loading ramps or gantries. For example, landing gear doors must provide clearance to the ground, the landing gear, and any symmetrically opposite landing gear door under all operating conditions of the aircraft.

A problem arises when a door is large and the distance available to clear other aircraft structures or other external structures is relatively small. For example, if the door is a landing gear door, the ground clearances may be small and the door may be liable to be damaged by contact with the ground. One solution is to provide a two-part door which folds up to provide the necessary clearance. Such doors, when provided for landing gear, commonly fold inwards towards the landing gear and can require additional devices to ensure that extension of the landing gear is achieved without interference between the landing gear and the door. Furthermore, the folding procedure and mechanism for a folding door can be complex.

SUMMARY OF THE INVENTION

An embodiment of the invention provides a door for opening and closing a door aperture in an aircraft comprising:
a first door member pivotably engaged with an aircraft structure at a first attachment point;
a second door member pivotably engaged with the first door member;
a third door member pivotably engaged with the second door member;
a first linkage member pivotably engaged with the first and third door members;
a second linkage member pivotably engaged with the second door member and the aircraft structure at a second attachment point; and
the door members and linkage members being arranged to form a single door when in a closed position and being interconnected such that an opening movement of the first door member in the form of a rotation about the first attachment point results in the substantially simultaneous movement of the second and third door members towards their respective open positions.

Each door member may comprise an exterior face and an opposite interior face, the outer face being arranged, in the closed position of the door, to substantially conform with the skin of the aircraft and the movement of the door members into the open position results in the relative pivoting of the exterior face of the first door member towards the exterior face of the second door member and the relative pivoting of the interior face of the second door member towards the interior face of the third door member. The second door member may be formed so as to conform to an aperture adjacent an edge of the first door member and to sit substantially within the aperture when the door is in the closed position. The first linkage member may be pivotably engaged with the first door member via a bridge member, the bridge member spanning the aperture so as to enable the first linkage member to move within the aperture during the opening movement. The linkage members and the door members may be pivotably engaged about a set of substantially parallel axes.

The door members and the first linkage member may comprise a four bar linkage grounded at the first attachment points and activated by the second linkage member. The function of each linkage member may be provided by a plurality of such linkage members. The door members may be pivotably engaged via one or more hinge mechanisms. The first attachment point may be arranged such that at least a part of the first door member locates within the body of the aircraft when the door is in its open position. The rate of pivotal movement of the second and third door members may be twice the rate of pivotal movement of the first door member during the opening movement. The radial offset of the second attachment point from the first attachment point determines the amplitude of the motion of the second and third door members. The circumferential position of the second attachment point on an arc drawn about the first attachment point may determine the relative motion of the first and second door members. The functional axis of the second linkage member may be substantially perpendicular to a plane containing the first and second attachment points when the door is closed and substantially parallel to the plane when the door is open.

Another embodiment provides a door for opening and closing a door aperture in an aircraft, the door comprising a first, second and third door members pivotably joined and arranged to move from a closed position in which the members are located in a substantially linear arrangement in the aircraft skin to an open position in which the members are located in a relative folded arrangement with the second and third door members situated substantially above the lowest edge of the first door member.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS OF THE INVENTION

Figure 1:
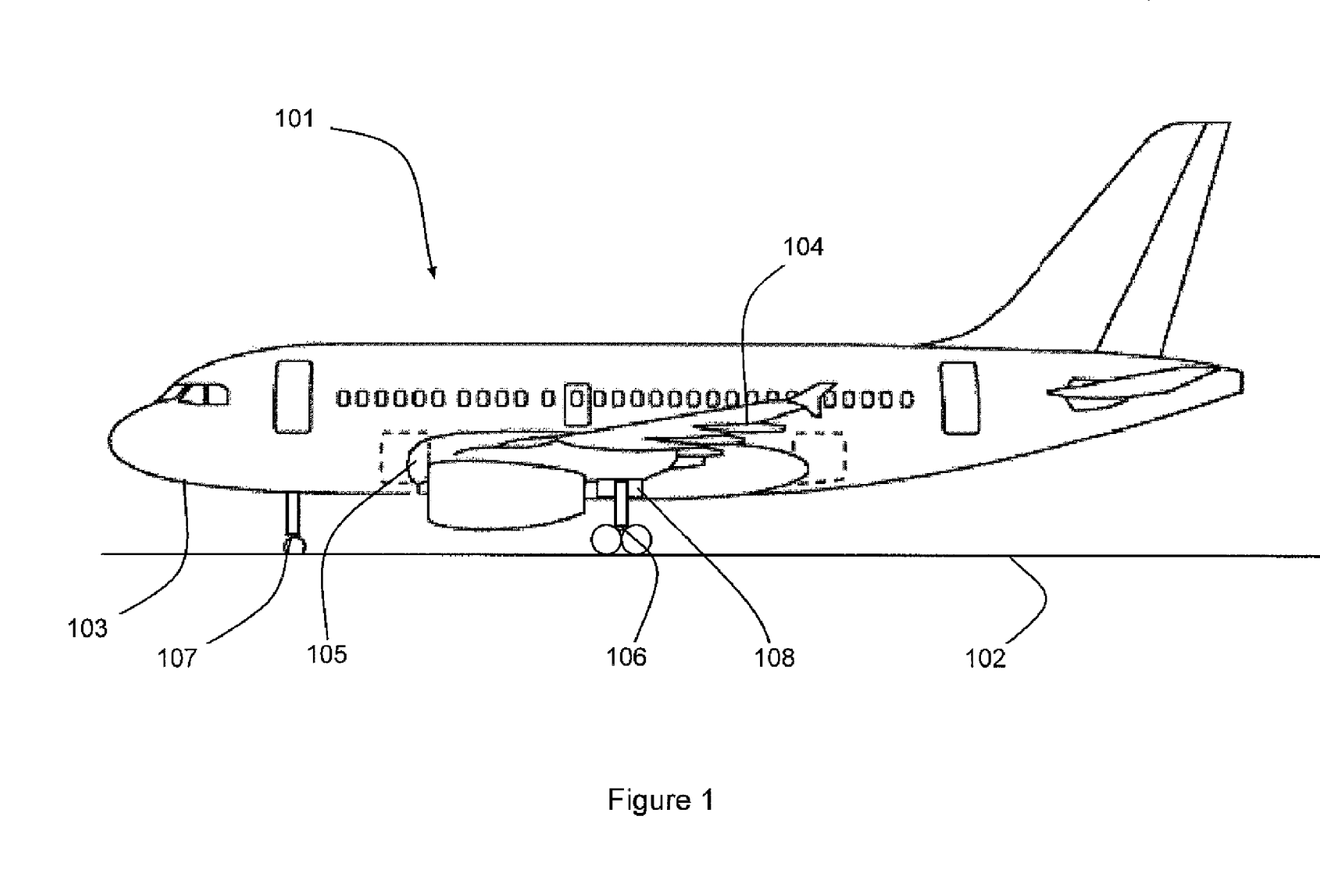
FIG. 1 is a side view of an aircraft on the ground.

With reference to FIG. 1, an aircraft 101 shown situated on the ground 102 comprises a fuselage 103 and a set of wings 104. The wings 104 are faired into the fuselage 103 via a belly fairing 105. The aircraft 102 is supported on the ground 102 by main landing gear 106 and a nose wheel 107. During flight, the main landing gear 106 is stowed within the wings 104 and fuselage 103 of the aircraft 102, covered by a set of landing gear doors 108.

Figure 2:
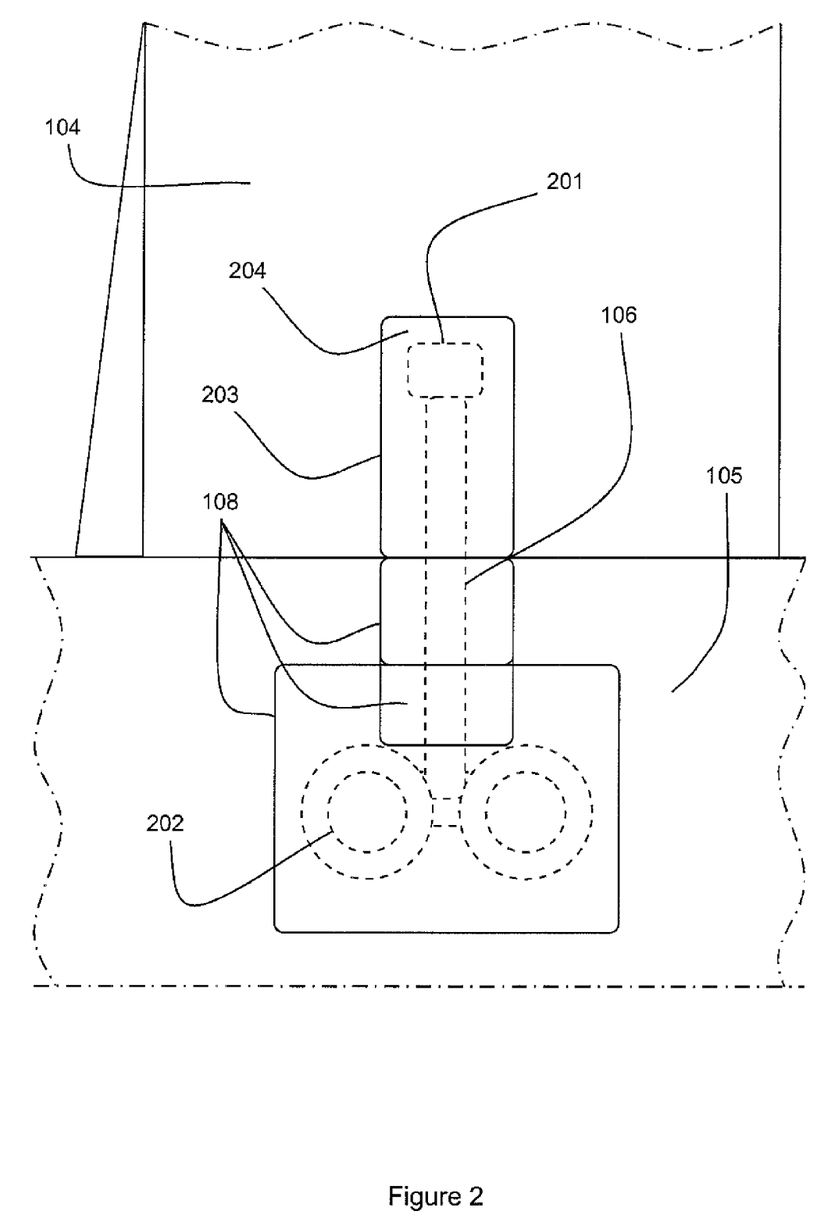
FIG. 2 is a view of the landing gear doors of the aircraft of FIG. 1 in the closed position.

With reference to FIG. 2, the main landing gear 106 comprises a strut 201 attached and hinged to the internal structure of the wing 104. The strut 201 supports a set of wheels 202 and is hinged so as to enable the landing gear 106 to pivot between the deployed position as shown in FIG. 1 and the stowed position as shown in FIG. 2 by dotted lines. The landing gear 106 is stowed in a bay 203 that extends spanwise from the central region of the fuselage 103 in the belly fairing 105 into the wing 104. The region of the bay 203 within the belly fairing 105 is closed by the main landing gear door 108, which comprises three door members. The region of the bay 203 in the wing 104 is closed by a wing door 204, which, in the present embodiment, comprises a single door member. The landing gear door 108 is arranged to provide sufficient clearance between a landing gear door 108 and the ground, the landing gear and the symmetrically opposite door (not shown) in all operating conditions.

Figure 3:
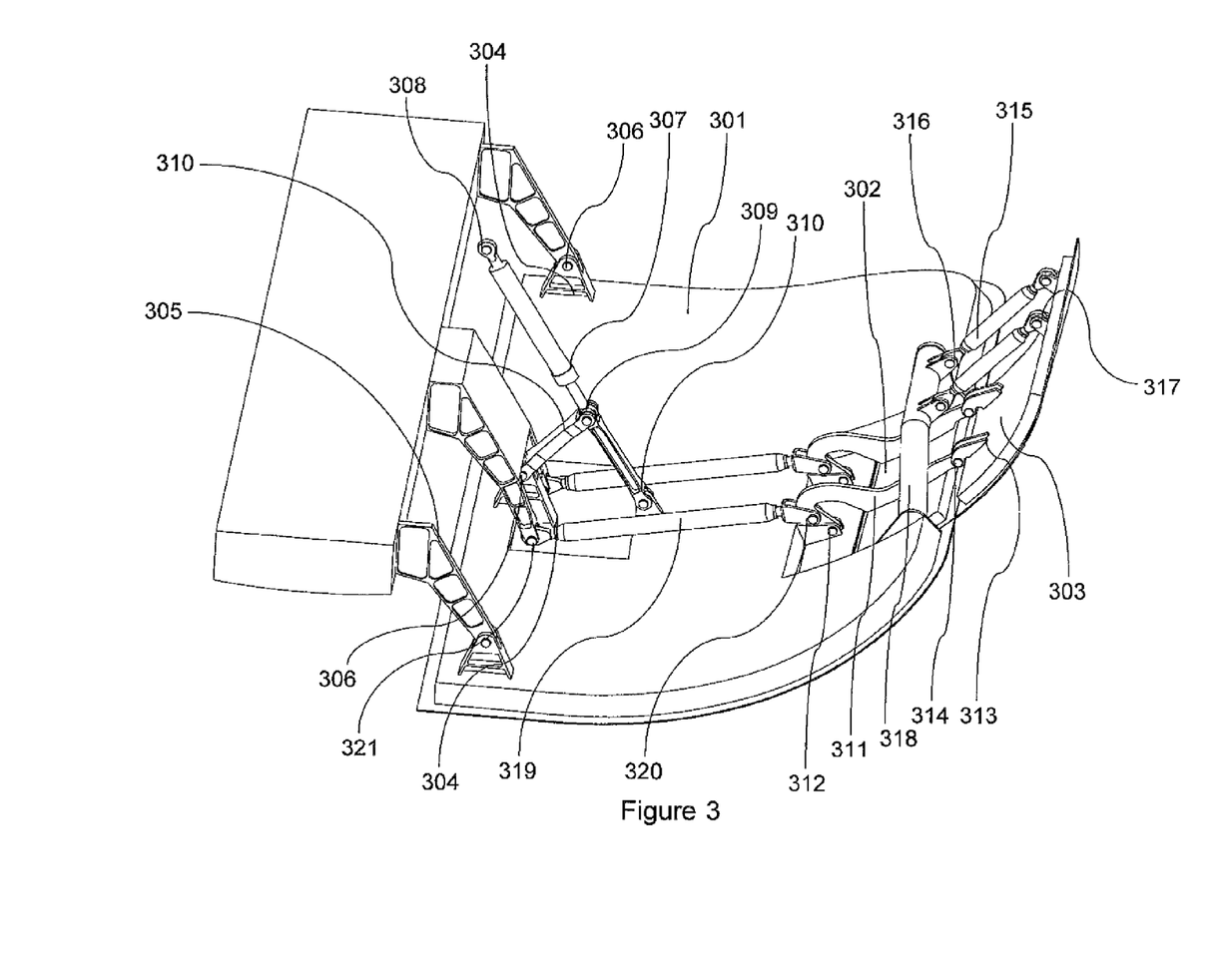
FIG. 3 is a detailed view of the landing gear door of FIG. 2.

FIG. 3 shows the landing gear door 108 in further detail. In FIG. 3, where elements comprise one of a set of functional duplicates, only one member of the set is labelled for clarity. The main landing gear door 108 comprises three door members in the form of panels 301, 302, 303, which together form a complementary shape to that of the opening in the outer skin of the belly fairing 105. The second door member 302 sits within an aperture in the first door member 301 and the third door member 303 is appended to the second door member 302. The first door member or panel 301 is supported by a set of three rigid arms 304 fixed at one of each of their ends to the internal structure 305 of the aircraft 101 inside the landing gear bay 203. The other ends of the rigid arms 304 are pivotably fixed to the first door member 301 by a first set of pivot pins 306. A door actuator, in the form of a jack 307, is connected between the first door member 301 and the aircraft structure 305. The jack 307 is pivotably connected to the aircraft structure 305 by second pivot pin 308 and to the first door member 301 by third pivot pin 309 acting through two struts 310.

The second door member 302 is supported by the first door member 301 through a second set of rigid arms 311 fixed to the second door member 302 and capable of pivoting on the first door member 301 about a fourth set of pivot pins 312. The second set of rigid arms 311 are formed as swan-necks so as to enable the second door member 302, in its opening movement, to move fully out of the aperture in the first door member 301 in which it sits when the door 108 is in the closed position.

The third door member 303 is supported by the second door member 302 through a third set of rigid arms 313 and is capable of pivoting relative to the second door member 302 about a fifth set of pivot pins 314. The third door member 303 is also connected to the first door member 301 by a first set of connecting links 315. The connecting links 315 are arranged to pivot relative to the third door member 303 about a sixth set of pivot pins 316 and are arranged to pivot relative to first door member 301 about a seventh set of pivot pins 317. The seventh set of pivot pins 317 are mounted on a rigid structure 318 in the form of a bridge, which is fixed across the aperture in the first door member 301 in which the second door member 302 sits. The bridge allows the first set of connecting links 315 to move within the aperture in the first door member 301 vacated by the second door member 302 during the opening movement of the door 108.

A second set of connecting links 319 are connected to the second door member 302 and are arranged to pivot relative to it about an eighth set of pivot pins 320. The second set of connecting links 319 are also pivotably connected to the aircraft structure 304 by a ninth set of pivot pins 321. The axes of the sets of pivot pins 306, 308, 309, 312, 314, 316, 317, 320 & 321 are arranged generally parallel to the longitudinal axis of the aircraft 101. The proportions of the panels and connecting links, and the relative positions of the pivot pins cause the panels to fold in such a manner as to achieve the required clearance to the ground 102.

Figure 4:
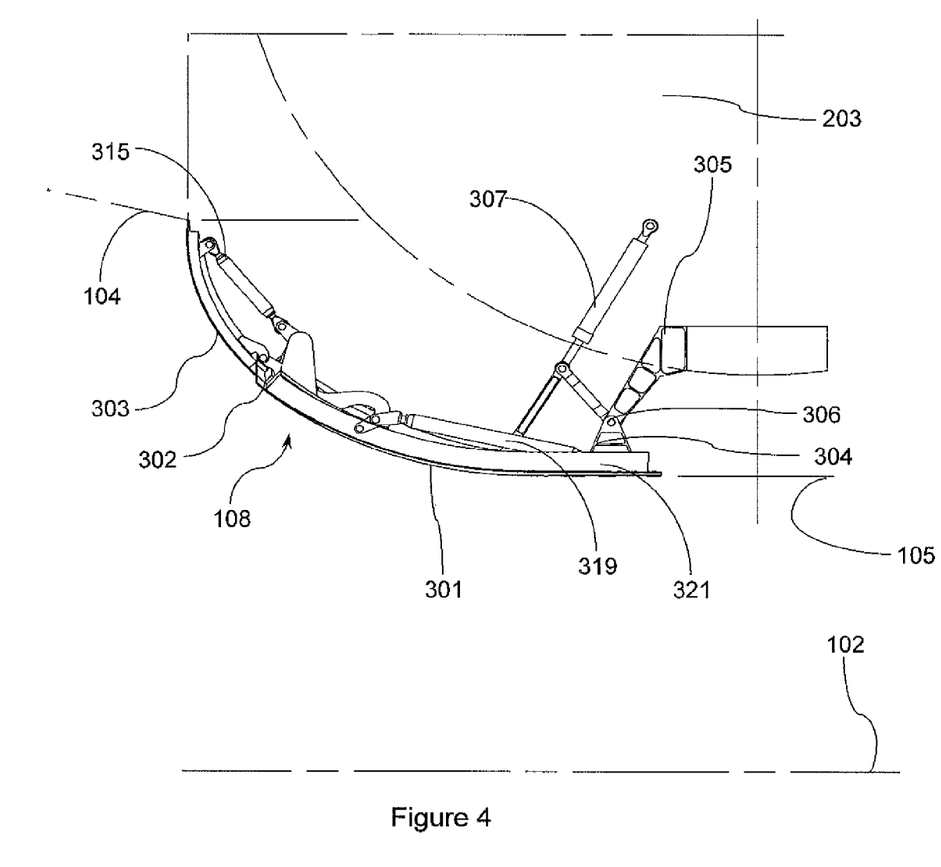
FIGS. 4, 5 & 6 are further detailed views of the landing gear door of FIG. 2 illustrating its operation.

FIG. 4 shows a forward view of the main landing gear door 108 in its closed position in which the second door member is seated within its aperture in the first door member and the three door members together conform to the exterior skin of the aircraft 101 to close the landing gear bay 203. The door 108 is brought into its closed position by the operation of the jack 307 pulling the first door member 301 inboard. This inboard movement of the first door member 301 acts through the first and second sets of connecting links 315, 319 to align the second and third door members into their closed positions. The first, second and third door members 301, 302, 303, and the first set of connecting links 315 together form a four bar linkage. This four bar linkage is actuated by the second set of connecting links 319 that are earthed to the aircraft structure 305 at a point spaced from the pivot pin 306 of the first door member 301 and act as the base linkage. Such a four bar linkage system enables the actuation movement of the second set of connecting links 319, which is created by the jack 307, to be substantially simultaneously transmitted to each element in the four bar linkage to open or close the door 108.

Figure 5:
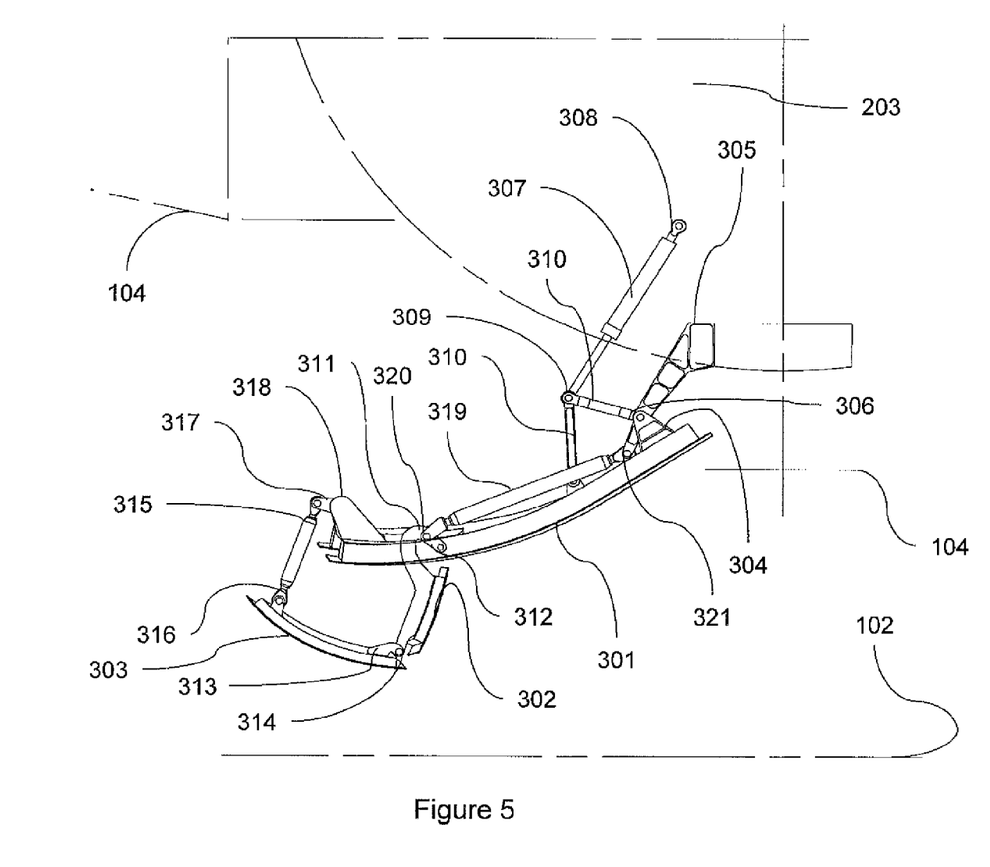

FIG. 5 shows the door 108 in a position midway between its closed position, shown in FIG. 4, and its fully open position. In the closed position, the exterior face of each door member 301, 302, 303 substantially conform to the skin of said aircraft. Movement of the door members 301, 302, 303 towards the open position, results in the relative pivoting of the exterior face of the second door member 302 towards the exterior face of the first door member 301 and the relative pivoting of the interior face of the second door member 302 towards the interior face of the third door member 303.

Figure 6:
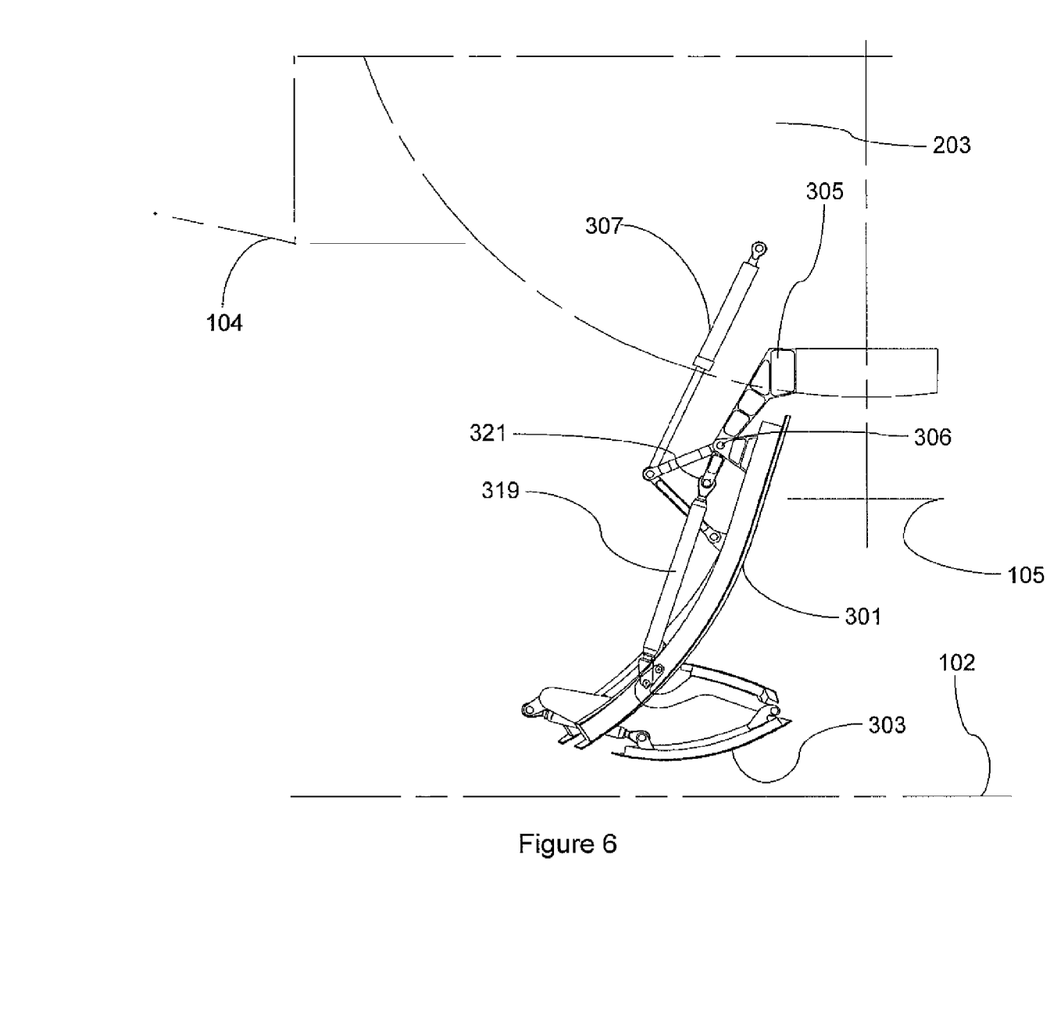

FIG. 6 shows the door 108 in the fully open position in which the second and third door members 302, 303 are positioned substantially above the lowest edge of the first door member 301. The second set of connecting links 319 have pushed the second door member 302 completely out of the aperture in the first door member 301 to move the exterior faces of the first and second door members to their approximately closest relative position. The third door member 303 has been rotated by the second door member 302 to bring their respective interior faces into their approximately closest relative position. The first set of connecting links 315 now sit within the aperture in the first door member 301 vacated by the second door member 302.

The relative positions of the first set of pivot pins 306 which form the hinge of the first door member 301 and the ninth set of pivot pins 321, which form the attachment point for the second set of connecting links 319, determine the motion of the second and third door members 302, 303. These sets of pivot pins 306, 321 are both attachments to the aircraft structure 305. The radial offset of the first set of pivot pins 306 from the ninth set of pivot pins 321 determines the amplitude for the motion imparted to the second and third door members 302, 303. The circumferential position of the ninth set of pivot pins 321 on an arc drawn about the first set of pivot pins 306 determines the relative motion of the first and second door members 302, 303. In the above embodiment, the functional axis of the second set of connecting links 319 are approximately perpendicular to the plane containing the first set of pivot pins 306 and the ninth set of pivot pins 321 when the door 108 is closed (see FIG. 4) and approximately parallel to that plane when the door is open (see FIG. 6). This arrangement gives a relatively rapid motion of the second and third door members as the first door member starts to open and very little motion of the second and third door members 302, 303 as the first door member approaches full opening. This relative movement enables adequate clearance between the door 108 and the ground 102 to be maintained during the opening and closing of the door 108.

The unequal division of the door 108 into a first door member 301 and two subsidiary door members 302, 303 enables the main panel to be integrated into the aircraft 101, both structurally and operationally, in a similar manner to a conventional single panel door. The first door member 301 provides the hinge to the aircraft structure 305, the actuation system 307 and a structure for attachment of a locking system for holding the door 108 closed. Thus the second and third door members 302, 303, being relieved of such functions, are more simply and lightly constructed.

In case of a failure in the actuation systems for the door 108 or landing gear 106, it is necessary for the doors to be opened by being pushed by the landing gear 106. This process is commonly referred to as gravity extension of the landing gear. The bridge 318 attached to the first door member 301 allows the landing gear 106 to push the entire door 108 into the open position in such an event. Importantly, the bridge is arranged so that the landing gear will not catch on the bridge 318 or any other part of the door 108 during such gravity extension of the landing gear. Furthermore, the second and third door members 302, 303 are moved outwards automatically, out of the path of the landing gear 106. In other words, there is no contact between the landing gear 106 and the second or third door members 302, 303 or their associated connecting links 315, apart from with the bridge 318.

As will be understood by those skilled in the art, one or more of the sets of pivot pins or hinges and connecting links in the above embodiments may be substituted for single hinges or links. Alternatively, one or more of the sets of pivot pins or hinges and connecting links may be supplemented with further hinges or links. Also, the wing gear door 203 may be arranged in two pieces, one bolted to the strut 201 and a smaller one at the top end of the strut 201 hinged off the wing. The jack 307 may be attached to the first door member 301 by one bracket rather than two struts 310.

In other embodiments, the door is a passenger compartment door, a cargo hold door, an inspection or maintenance hatch door, or other aircraft door.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A door for opening and closing a door aperture in an aircraft comprising:
   a first door panel pivotably engaged with an aircraft structure at a first attachment point;
   a second door panel pivotably engaged with said first door panel;
   a third door panel pivotably engaged with said second door panel;
   a first linkage member pivotably engaged with said first and third door panels;
   a second linkage member pivotably engaged with said second door panel and said aircraft structure at a second attachment point; and
   said door panels configured to form a single door when in a closed position, and each door panel having an exterior face substantially conforming to the skin of said aircraft when said panels are in said closed position, said door panels are interconnected by said linkage members such that an opening movement of said first door panel in the form of a rotation about said first attachment point results in the substantially simultaneous movement of said second and third door panels towards their respective open positions.

2. A door according to claim 1 in which each said door member comprises an interior face opposite said exterior face, and said movement of said door panels into said open position results in the relative pivoting of said exterior face of said first door panel towards said exterior face of said second door panel and the relative pivoting of said interior face of said second door panel towards said interior face of said third door panel.

3. A door according to claim 1 in which said second door panel is formed so as to conform to an aperture adjacent an edge of said first door panel and to sit substantially within said aperture when said door is in said closed position.

4. A door according to claim 3 in which said first linkage member is pivotably engaged with said first door panel via a bridge member, said bridge member spanning said aperture so as to enable said first linkage member to move within said aperture during said opening movement.

5. A door according to claim 1 in which said second door panel is pivotably engaged with said first door panel so as to enable said second door panel to move fully out of said aperture during said opening movement.

6. A door according to claim 1 in which said linkage members and said door panels are pivotably engaged about a set of substantially parallel axes.

7. A door according to claim 1 in which said door panels and said first linkage member comprise a four bar linkage grounded at said first attachment points and activated by said second linkage member.

8. A door according to claim 1 in which the function of each linkage member is provided by a plurality of such linkage members.

9. A door according to claim 1 in which said door panels are pivotably engaged via one or more hinge mechanisms.

10. A door according to claim 1 in which said first attachment point is arranged such that at least a part of said first door panel locates within the body of said aircraft when said door is in its open position.

11. A door according to claim 1 in which the rate of pivotal movement of said second and third door panels is twice the rate of pivotal movement of said first door panel during said opening movement.

12. A door according to claim 1 in which the radial offset of said second attachment point from said first attachment point determines the amplitude of the motion of said second and third door panels.

13. A door according to claim 1 in which the circumferential position of said second attachment point on an arc drawn about said first attachment point determines the relative motion of the first and second door panels.

14. A door according to claim 1 in which the functional axis of said second linkage member is substantially perpendicular to a plane containing said first and second attachment points when said door is closed and substantially parallel to said plane when said door is open.

15. A door for opening and closing a door aperture in an aircraft, the door comprising a first, second and third door members pivotably joined and arranged to move from a closed position in which said members are located in a substantially linear arrangement in the aircraft skin to an open position in which said members are located in a relative folded arrangement with the second and third door members situated substantially above the lowest edge of the first door member.

16. A door for opening and closing a door aperture in an aircraft comprising:
 a first door member pivotably engaged with an aircraft structure at a first attachment point;
 a second door member pivotably engaged with said first door member;
 a third door member pivotably engaged with said second door member;
 a first linkage member pivotably engaged with said first and third door members;
 a second linkage member pivotably engaged with said second door member and said aircraft structure at a second attachment point; and
 said door members and linkage members being arranged to form a single door when in a closed position and being interconnected such that an opening movement of said first door member in the form of a rotation about said first attachment point results in the substantially simultaneous movement of said second and third door members towards their respective open positions, wherein each said door member comprises an exterior face and an opposite interior face, said exterior face being arranged, in said closed position of said door, to substantially conform with the skin of said aircraft and said movement of said door members into said open position results in the relative pivoting of said exterior face of said first door member towards said exterior face of said second door member and the relative pivoting of said interior face of said second door member towards said interior face of said third door member.

* * * * *